Patented Jan. 9, 1951

2,537,229

UNITED STATES PATENT OFFICE 2,537,229

PRODUCTION OF ACID-SOLUBLE TITANIA SLAGS

Robert S. I. McLaren, Shawinigan Falls, Quebec, Canada, assignor to Shawinigan Water and Power Company, Montreal, Quebec, Canada, a corporation of Quebec No Drawing. Application February 15, 1949, Serial No. 76,653. In Canada August 4, 1948

6 Claims. (Cl. 75—30)

1

This invention relates to the treatment of titaniferous iron ores and ore concentrates, e. g. ilmenite, to produce a slag that is rich in titanium dioxide and has particular properties, and also to the titania enriched product itself.

Titanium dioxide pigments are produced by digesting, with sulfuric acid, material containing titania, to give a solution containing dissolved titanium dioxide. This solution is then treated to recover the titanium dioxide as an hydrolysate. The proportion of titania in the starting material, whether it be a naurally occurring mineral, a beneficiated ore, or a furnaced slag, and the degree and rate of solution of that titania portion in sulfuric acid, are factors of major importance in the economics of the titanium pigment industry.

It is the principal object of this invention to produce titanium dioxide rich slags from titaniferous iron ores, which slags are easily digested in sulfuric acid and are therefore suitable for use in the production of titanium dioxide pigments. The invention includes the novel methods hereinafter described and also the new acid-soluble slags produced thereby.

It has previously been proposed to smelt titaniferous iron ores with carboniferous reducing agents such as coke, coal, charcoal, and the like, and fluxing agents such as limestone, lime, alumina, and others, to produce pig iron and slags rich in titanium dioxide. However, the slags produced by these processes have not been well suited for use in pigment manufacture because they are of limited solubility in sulfuric acid and also because they require relatively large amounts of sulfuric acid for digestion. The large amounts of sulfuric acid necessary for the digestion of the prior art slags have been due partly to consumption by the acid-soluble constituents other than titania, chiefly the basic fluxes in the slags, and partly to the indigestibility of the rutile form of titanium dioxide present in the slags. One of the additional objects of this invention is thus the production of titania rich slags in which the content of acid consuming materials other than titanium dioxide is kept as low as possible. Another additional object of this invention is the production of titania rich slags in which the titanium dioxide is present substantially completely in a form readily soluble in sulfuric acid, with a minimum amount of the slowly soluble rutile form of titanium dioxide present. The objects and advantages of the invention will be further apparent to those skilled in the art from the ensuing description of the invention.

2

The invention

According to this invention titaniferous iron ore, carbonaceous reducing agent, and basic fluxing agent, in suitable ratio, are smelted as a furnace charge to reduce the bulk of the iron compounds to molten metallic iron and to form a fluid molten slag of titanium dioxide, fluxing agent, and extraneous materials, then the molten slag is separated from the molten iron and cooled rapidly to a temperature below that at which titanium dioxide can crystallize in the rutile form. The cooling step is, in effect, a quenching operation, since the slag is rapidly cooled from the molten state through a temperature range at which an undesirable conversion can occur, to a temperature at and below which the undesirable conversion does not occur. The undesirable conversion that must be avoided is the conversion of titanium dioxide to its rutile crystalline form. This form is the most stable crystalline form of titania at temperatures above 1000° C., and is the form in which titania tends to crystallize at the highest crystallizing temperatures. Titanium dioxide of other crystalline forms can alter to the rutile form, (cf. Dana's "Textbook of Mineralogy"); this tendency also is inhibited by the process of this invention.

According to the preferred method of this invention, when titaniferous iron ore, carbonaceous reducing agent, and basic fluxing agent are smelted in a furnace, the proportions of the components of the charge in the furnace are adjusted so that for each mole equivalent of "acidic" reacting material other than titanium dioxide in the slag, there will be one mole equivalent of "basic" reacting material plus one mole equivalent of "basic" reacting material for each 5 to 12 mole equivalents of titanium dioxide in the slag. All the extraneous materials present in the charge are taken into account; their effects as either "acidic" or "basic" material modify the amount of "basic" fluxing agent added so that the above specified balance between "acidic" and "basic" constituents is maintained.

For the purposes of this invention, numerous basic materials are suitable as basic fluxing agents. The most common suitable fluxing agent is lime, which can conveniently be used in the form of limestone. Limestone usually contains the equivalent of some magnesia, which is also a suitable basic fluxing agent, and when present in a furnace charge should be taken into account as a basic fluxing material. Soda ash and caustic soda are also effective as basic fluxing agents.

If it is desired to retain a portion of the iron oxides from the ore to act as flux in the slag, the unreduced iron oxide should be taken into account as a "basic" material when calculating the proportions of flux required in the charge to give the above specified balance of "acidic" and "basic" constituents.

For the purposes of this invention, "acidic" reacting materials occurring in the furnace charges are, with the exception of titania itself, unessential and undesirable. Beneficiation or concentration of some ores may be performed to advantage to remove part of the undesirable "acidic" material. The most common of these extraneous materials are silica and alumina which occur as impurities in the ore, coal, and fluxing agent. (Alumina is considered to be an acidic material in the variety of slags involved in the invention.) For each mole equivalent of these two and other acidic materials in the slag there should be one mole equivalent of basic material in the slag in addition to one mole equivalent of basic material for each 5 to 12 mole equivalents of titanium dioxide.

When the slags produced according to this invention are digested in sulfuric acid, there is required, in addition to the amount of sulfuric acid required to dissolve titanium dioxide, an extra amount of sulfuric acid to dissolve the basic material present in the slag, part of which basic material is present as flux for the titanium dioxide and part of which is present to compensate for the presence of the acidic materials such as silica and alumina. Hence it is most desirable, particularly from an economic point of view, to have as little as possible of the acidic materials in a furnace charge, so that the slag produced will not require additional quantities of basic constituents that consume extra sulfuric acid in the subsequent digestion of the slag. Furthermore, to the extent that the acidic materials dissolve in sulfuric acid when the slag is digested, additional sulfuric acid is consumed by the acidic materials themselves. Hence to enable the slag to be digested most economically, it must contain as small a proportion as possible of the acidic materials such as silica and alumina.

The following examples illustrate typical preparations of the titania rich slag of this invention according to the process of this invention.

Example 1

This example illustrates the smelting of titaniferous iron ore of the following composition: FeO—32.38%, Fe$_2$O$_3$—24.00%, TiO$_2$—36.70%, SiO$_2$—1.27%, Al$_2$O$_3$—2.39%, CaO—0.05%, MgO—3.06%.

The smelting operation was carried out in a 54 volt, 100 kilowatt electric furnace. 150 lbs. of the ore were smelted with 21.5 lbs. coke and 10.5 lbs. limestone. The limestone and coke had the following approximate compositions:

|  | Limestone | Coke |
|---|---|---|
|  | Per cent | Per cent |
| FeO | 0.45 | 0.90 |
| SiO$_2$ | 2.00 | 3.10 |
| Al$_2$O$_3$ | 0.50 | 2.60 |
| CaO | 53.60 |  |
| MgO | 0.80 |  |
| Fixed C |  | 90.0 |

Calculation of a material balance of the acidic and basic components of this charge will show that there is one mole of basic material for each mole of acidic material other than titania, plus a quantity of basic material equivalent to one mole for each 5.25 moles of titania.

The furnace charge was smelted for a period of about 1¾ hours during which time a fluid slag was formed and most of the iron oxides were reduced to metallic iron which settled in a molten state beneath the molten slag.

The molten slag and molten iron were tapped from the furnace in separate streams. The slag was tapped into a large iron pan to form a thin layer which cooled rapidly to below a red heat. The slag was found to have the following approximate composition: FeO—8.3%, SiO$_2$—2.4%, Al$_2$O$_3$—5.3%, CaO—7.3%, MgO—5.1%, TiO$_2$—69.5%. The slag was examined by X-ray diffraction methods; the X-ray diffraction pattern showed no definite indications of the presence of any rutile whatsoever, indicating the substantially complete absence of rutile. The titania was found to be 91% soluble in a standard laboratory digestion procedure using sulfuric acid.

Example 2

This example illustrates the smelting of a beneficiated titaniferous iron ore of the following composition: FeO—35.9%, Fe$_2$O$_3$—15.4%, TiO$_2$—44.8%, SiO$_2$—1.46%, Al$_2$O$_3$—0.44%, CaO—0.10%, MgO—0.59%, MnO, Cr$_2$O$_3$, etc., remainder.

40 lbs. of this ore were smelted with 4.5 lbs. of coke and 3.0 lbs. of limestone, as in Example 1. The limestone was of the same composition as that used in Example 1. The coke had the following proximate analysis: FeO—1.17%, SiO$_2$—4.03%, Al$_2$O$_3$—3.39%, fixed C—87.0%. Calculation of a material balance of the acidic and basic components of this charge shows that there is one mole of basic material for each mole of acidic material other than titania in the charge, plus basic material equivalent to one mole for each 11.4 moles of titania.

This furnace charge was smelted to reduce the iron oxides; molten iron and a fluid slag which separated readily were produced. The molten slag was tapped from the furnace and quenched immediately in water. The molten iron was tapped separately from the furnace.

On analysis the slag was found to have the following composition: FeO—2.9%, SiO$_2$—5.2%, Al$_2$O$_3$—2.4%, CaO—9.5%, MgO—1.3%, TiO$_2$—78.6%. This slag was also examined by X-ray diffraction methods; the X-ray diffraction pattern also showed no definite indications of the presence of rutile. The digestion yield, in a standard laboratory digestion procedure, was 96%.

During the tapping operation a portion of the molten slag was allowed to remain in the furnace. This material cooled slowly to room temperature as the furnace cooled. When cold, the slag was removed from the furnace and analyzed in the same manner as the water-quenched slag. It was found to have the same approximate chemical composition, but its X-ray diffraction pattern showed the presence of approximately 23% of the rutile form of titania. Thus it is readily seen that rapid cooling of titania slag to below the range of temperature of conversion of titania to its rutile form has avoided the formation of rutile, while slow cooling has permitted the formation of rutile. The digestion yield of the unquenched material containing the rutile was only 57% in the standard laboratory digestion test.

Samples of the quenched slag and the rutile containing slag were tested to determine their relative rates of reaction in a standard digestion procedure used in the titanium pigment industry. The quenched slag was found to have a rate of reaction ten times that of the slag containing 23% rutile. This is an excellent indication of how much more readily than prior art slags, the titania-bearing slags of this invention can be digested.

The residue from the standard digestion of a sample of the rutile-containing slag was found to be largely rutile, indicating that the rutile originally present did not digest with the rest of the slag.

*Example 3*

This is another example of the smelting of the ore used in Example 2. 32 lbs. of the ore were smelted with 3.8 lbs. coke and 2.38 lbs. limestone as in Example 2. The resulting titania rich slag was fluid and tapped easily from the furnace at a temperature of 1420° C. into a large iron pan where it cooled quickly to below red heat. On analysis, the slag was found to have the following approximate composition: FeO—0.6%, $TiO_2$—82.0%, $SiO_2$—3.6%, $Al_2O_3$—1.8%, CaO—7.3%, MgO—1.3%, MnO, $Cr_2O_3$, etc.—remainder. By a substantially complete reduction of the iron oxides to metallic iron, the slag was thus enriched to 82% titania. The digestion yield in a laboratory digestion procedure was 83%.

*Example 4*

This example illustrates the use of sodium hydroxide as the fluxing agent added in the smelting of an ilmenite ore. The ore had the following approximate composition: FeO—26.72%, $Fe_2O_3$—22.42%, $TiO_2$—40.80%, $SiO_2$—2.41%, $Al_2O_3$—3.48%, CaO—0.39%, MgO—4.00%.

30 lbs. of this ore were smelted with 1.50 lbs. of caustic soda having 76.0% $Na_2O$ content, and 2.75 lbs. coke of the same proximate analysis as that used in Example 2. Calculation of a material balance of the acidic and basic components of this charge shows that there is one mole of basic material for each mole of acidic material, plus basic material equivalent to one mole for each 6.12 moles of titania.

The charge was smelted in a 45 volt, 50 kilowatt, electric furnace. The smelted material separated into a layer of molten iron beneath a layer of very fluid slag. The slag was tapped into a large iron pan where it cooled quickly to below red heat.

On analysis, the slag was found to have the following approximate composition: FeO—3.5%, $TiO_2$—70.5%, $SiO_2$—4.8%, $Al_2O_3$—6.6%, CaO—0.7%, MgO—6.9%, $Na_2O$—6.6%. In a standard digestion test the titania was found to be 91% soluble, and appeared to react more readily and completely than slags fluxed with limestone.

The important step in the method of this invention is the rapid cooling or quenching of the titania rich slag from its high temperature in the molten state to a temperature at and below which the titania does not crystallize in the rutile form. This entails more than merely cooling the slag till it solidifies from the molten state. Titania in the solid state at high temperatures can alter from metastable forms to the rutile form, and, it is believed, rutile can crystallize from solid solutions of titania and basic fluxing agents at high temperatures.

Most titania rich slags are solid below about 1200° C. The rate of conversion of titania, in the solid state, to its rutile crystalline form is appreciable at temperatures down to about 900° C. Below this temperature the titania in titania rich slags does not alter readily to rutile. Hence, to obtain the highly reactive titania rich slags of this invention it is essential rapidly to cool molten titania rich slags to a temperature below about 900° C. The temperature range between about 900° C. and the melting point of a slag can be called a critical temperature range for the purposes of this invention.

The rapid cooling step may be performed effectively by quenching molten slag with water. Quenching with water assures the practically instantaneous formation of a solid slag with the titania in an easily digested form and complete absence of rutile. The rapid cooling step may also be carried out by impinging a jet of air against the molten slag. In this manner the slag can be comminuted by the air blast and the resulting small particles of slag cooled rapidly below the critical temperature range in which rutile is formed. As illustrated in the examples, small quantities of molten slag may be cooled rapidly by pouring them onto a large surface so that a large surface of slag is exposed, enabling the slag to cool rapidly, by radiation and conduction, to a temperature below the critical temperature range. Similarly, large quantities of molten slag may have a large surface exposed, to enable rapid cooling to below the critical range to take place, by pouring the slag in a thin layer on a belt or other moving surface that carries the slag as a thin layer while it cools to below the critical range.

Although quenching molten titania slag with water assures practically instantaneous cooling to below the critical temperature range, instantaneous cooling is not essential. The rate of formation of rutile in the temperature range between about 900° C. and the melting point of a titania rich slag is believed to be such that only insignificant amounts of rutile are formed in the first 5 to 10 minutes that the slag is in this temperature range. Hence cooling is usually sufficiently rapid if the titania bearing slag cools to below the critical temperature range within less than from about 5 to about 10 minutes.

The digestion yields of titania, given in the examples in this specification, do not specifically indicate the absolute yields of titania that can be recovered from the slags. In large scale plant operations it is nearly always found that the yield of titania obtainable from a furnaced titania slag or other titania bearing raw material is greater than the digestion yield obtained in standard laboratory digestion procedures. Hence the laboratory digestion yields quoted in the examples herein should be taken as an indication only, of the improved results obtainable by the process of the invention.

It will be understood, that, without departing from the spirit of the invention or the scope of the claims, various other modifications may be made in the specific expedients described. The latter are illustrative only and not offered in a restricting sense, it being desired that only such limitations shall be placed thereon as may be required by the state of the prior art.

I claim:

1. A method of producing, from a titaniferous iron ore or concentrate thereof, a quenched slag predominating in titania of ready solubility in sulfuric acid, which method comprises preparing a charge containing said ore together with sufficient carbonaceous reducing agent to reduce the iron oxide content thereof to metallic iron, and a basic flux, smelting said charge at a temperature such that a molten slag predominating in titania is formed and metallic iron settles therefrom, leaving the slag substantially free of metallic iron, separating the iron and slag, and cooling said molten slag rapidly to a temperature below about 900° C. whereby the formation of the rutile form of titania is substantially avoided.

2. A method, according to claim 1, in which the molten slag is cooled rapidly by quenching with water.

3. A method, according to claim 1, in which the molten slag is cooled rapidly by impinging thereon a blast of air.

4. A method, according to claim 1, in which the molten slag is cooled rapidly by spreading it in a thin layer on a cold surface.

5. A method of treating a titaniferous iron ore or concentrate thereof, which comprises mixing said ore or concentrate with a quantity of solid carbonaceous reducing agent sufficient to reduce the iron oxides to metallic iron and a quantity of basic fluxing agent such that the resulting charge contains one mole thereof for each mole of acidic material other than titania in the charge plus one mole for each 5 to 12 moles of titania, smelting said charge at a temperature within the range from about 1250° C. to about 1700° C. and maintaining the charge at smelting temperatures until it forms molten iron and a molten slag containing titania in predominant amount, fluxing agent and other residual constituents of the charge and from which slag substantially all the metallic iron has settled out, separating the iron and slag, and then rapidly cooling the molten slag to a temperature below about 900° C. whereby the formation of the rutile form of titania is substantially avoided.

6. A quenched titania-rich slag substantially free of metallic iron and rutile comprising a basic fluxing agent and titania, prepared by the method of claim 1, said slag showing by X-ray diffraction pattern substantially complete absence of rutile.

ROBERT S. I. McLAREN.

REFERENCES CITED

The following references are of record in the file of this patent:

UNITED STATES PATENTS

| Number | Name | Date |
|---|---|---|
| 486,941 | Rossi | Nov. 29, 1892 |
| 810,865 | Hoover et al. | Jan. 23, 1906 |
| 1,814,808 | Hughes | July 14, 1931 |
| 1,871,792 | Horsfield | Aug. 16, 1932 |
| 2,366,177 | Campbell | Jan. 2, 1945 |
| 2,375,268 | Wyckoff | May 8, 1945 |
| 2,445,377 | Wyckoff | July 20, 1948 |
| 2,471,242 | Royster | May 24, 1949 |
| 2,476,453 | Pierce et al. | July 19, 1949 |

FOREIGN PATENTS

| Number | Country | Date |
|---|---|---|
| 887,334 | France | Aug. 9, 1943 |
| 279,219 | Great Britain | Oct. 27, 1927 |